United States Patent [19]

Sivonen

[11] Patent Number: 4,850,332
[45] Date of Patent: Jul. 25, 1989

[54] MASONRY FIREPLACE, PARTICULARLY A BAKING OVEN

[76] Inventor: Juha Sivonen, Nilos, Eno, Finland, SF-81200

[21] Appl. No.: 113,058

[22] Filed: Oct. 27, 1987

[30] Foreign Application Priority Data

Oct. 27, 1986 [FI] Finland .................................. 864341

[51] Int. Cl.$^4$ .............................. F24B 1/02; F24B 1/04
[52] U.S. Cl. .................................... 126/8; 126/273 R; 126/19 R; 126/64; 126/75; 126/77; 126/58
[58] Field of Search ...................... 126/273 R, 242, 64, 126/19 R, 1 D, 1 F, 137, 75, 77, 17, 69, 58, 8, 1 R, 500; 110/323

[56] References Cited

U.S. PATENT DOCUMENTS

| 20,265 | 5/1858 | Graniger | 126/19 R |
| 305,691 | 9/1884 | Hynes | 126/75 |
| 858,285 | 6/1907 | Heuermann | 126/69 |
| 1,451,246 | 4/1923 | Wetzel | 126/137 |
| 2,428,183 | 9/1947 | Sueda | 126/75 X |
| 4,095,586 | 6/1978 | Selva | 126/8 X |
| 4,561,420 | 12/1985 | Thomsen | 126/77 |
| 4,582,045 | 2/1986 | Dorau et al. | 126/77 X |
| 4,628,899 | 12/1986 | Eriksson et al. | 126/64 |

FOREIGN PATENT DOCUMENTS 6502 11/1878 Fed. Rep. of Germany ..... 126/1 D

Primary Examiner—Robert E. Garrett
Assistant Examiner—Carl D. Price
Attorney, Agent, or Firm—William E. Mouzavires

[57] ABSTRACT

The invention relates to a masonry fireplace, particularly a baking oven, comprising: a furnace (4) in which the fuel is burnt and the bottom of which is formed by a baking grate (5), the furnace (4) being provided with an oven door (1) positioned in the front wall of the oven; an ash chest (7) positioned below the furnace (4) and provided with an ash door (2); a secondary fire chamber (10) positioned above the furnace (4) and into which a throat (9) leads from the back portion of the furnace (4); and substantially vertical cheek flues (15) extending downwards from the secondary fire chamber (10) on both sides of the oven door (1). In order to improve the coefficient of efficiency of the fireplace and to eliminate the risk caused by the coals possible falling on the opertor from the oven door, the fireplace according to the invention is characterized in that an opening (6) connecting the ash chest (7) to the back portion of the furnace (4) and to the secondary fire chamber is provided at the back of the furnace (4).

1 Claim, 2 Drawing Sheets

# MASONRY FIREPLACE, PARTICULARLY A BAKING OVEN

BACKGROUND OF THE INVENTION

The invention relates to a masonry fireplace operating on the secondary fire chamber principle, particularly a baking oven, comprising: a furnace in which the fuel is burnt and the bottom of which is formed by a baking grate, the furnace being provided with an oven door positioned in the front wall of the oven; an ash chest positioned below the furnace and provided with an ash door; a secondary fire chamber positioned above the furnace and into which a throat leads from the back portion of the furnace; and substantially vertical cheek flues extending downwards from the secondary fire chamber on both sides of the oven door.

When masonry fireplaces began to become popular in the 1970's, it became necessary to gain reliable information on the operation of fireplaces and the requirements they set for the materials and structures thereof. Such experiments have led to the introduction of the secondary fire chamber in baking ovens, too. The use of the secondary fire chamber provides a substantially clean combustion, high coefficient of effeciency, and the oven is also easy to manufacture. However, when planning new fireplaces, a higher coefficient of efficiency has constantly been aimed at.

Also, the position and operation of the coal dropping door causes problems in prior baking ovens. Since the coal dropping door is generally positioned immediately behind the oven door, there is a risk that coals fall out of the oven door on the operator. This kind of door also decreases the baking area of the oven.

SUMMARY OF THE INVENTION

The object of the present invention is to improve the coefficient of efficiency of the oven described in the beginning and to eliminate the problems caused by the coal dropping door. This is achieved by providing the back of the furnace with an opening connecting the ash chest to the back portion of the furnace and to the secondary fire chamber.

The basic idea of the invention is thus to form a connection from the ash chest to the back portion of the furnace and to a throat leading to the secondary fire chamber.

By virtue of the structure according to the invention, burning is more efficient, the coefficient of efficiency of the fireplace, such as an oven, is improved, because secondary air to be introduced through the ash door is preheated when it passes through the opening and is mixed with the burning gases in the back portion of the oven, and because the supply of oxygen is improved in the back and upper portions of the oven. On the other hand, the dropping of coals is more secure, because the coal dropping opening is positioned in the back wall of the oven. The coals are pushed into the opening, so that there is no risk of the coals falling out through the oven door. The baking area of the oven is also as large as possible, because it does not comprise any doors reducing the surface area.

In a preferred embodiment of the invention, the back wall of the ash chest is provided with a coal grate which is positioned below the opening and in which the coals finally burn into ashes. Flue gases from the after burning taking place on the coal grate are passed through the opening into the flues of the oven instead of a separate carbon monoxide chimney as normally. In this way the heat generated in the afterburning of the coals is recovered into the material contained in the oven, so that the coefficient of efficiency is improved in this way, too.

BRIEF DESCRIPTION OF THE DRAWINGS

In the following the invention will be described in more detail with reference to the examples of the attached drawings, in which.

A DETAILED DESCRIPTION OF THE INVENTION

Figure 1:
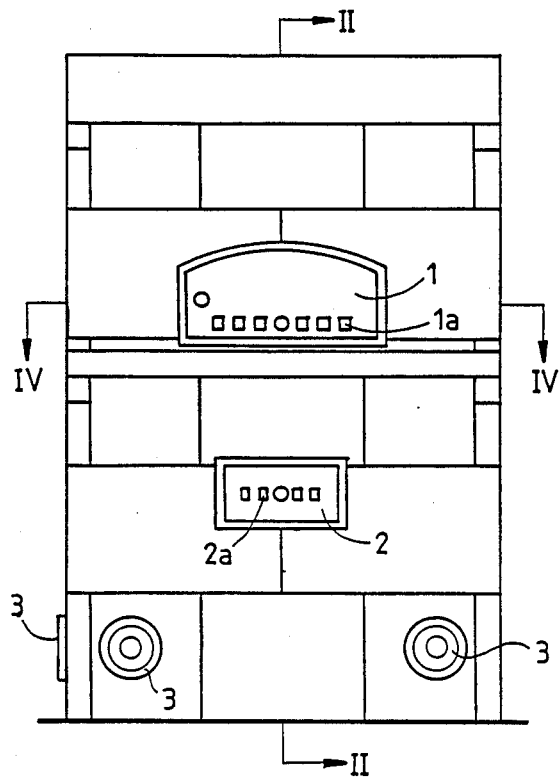
FIG. 1 is a front view of a baking oven according to the invention.

FIG. 1 shows a baking oven according to the invention, preferably manufactured of soap rock. One advantage of soap rock is that its heat capacity per volume unit is considerably higher than that of other stone materials. The oven is also easy to assemble from accurately measured, numbered soad rock elements. As is conventional, the front wall of the oven comprises an oven door 1 provided with adjustable air openings 1a for the introduction of primary air into the furnace. The front wall further comprises an ash door 2 positioned below the oven door and likewise provided with adjustable air openings 2a for the introduction of secondary air. The reference numerals 3 indicate soot doors for lower flues.

Figure 2:
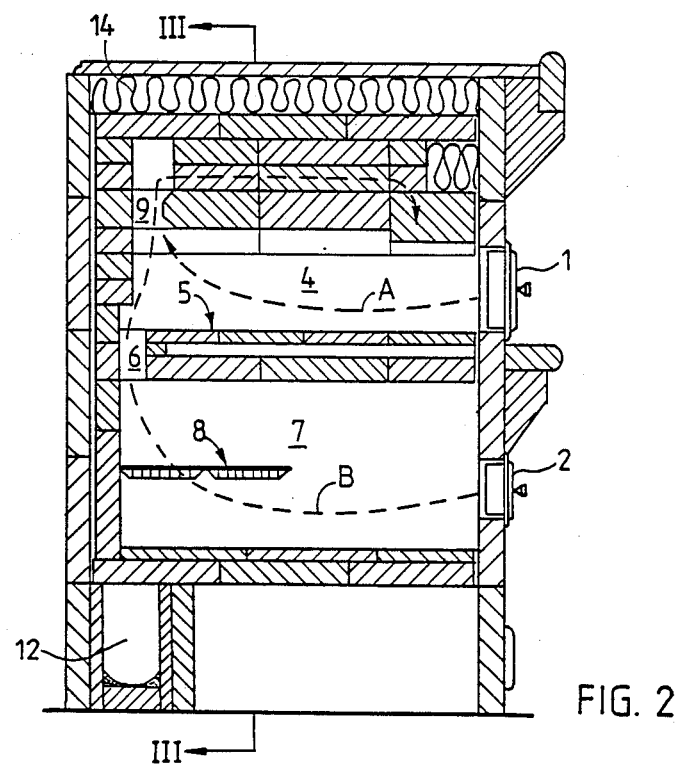
FIG. 2 is a longitudinal cross-sectional view of the oven along the line II—II shown in FIG. 1.

FIG. 2 is a longitudinal cross-sectional view of the baking oven. Wood is burnt in a horizontal combination oven and furnace chamber 4 which is positioned behind the oven door 1 and the bottom of which is formed by baking grate 5 on which the food is baked after the wood has burnt and the temperature in the oven has become even. The baking grate 5 extends up to the front wall of the oven, and there is no coal dropping door provided between the front edge of the baking grate and the oven door 1. The back portion of the baking grate 5 is provided with an opening 6 which connects an ash chest 7 to the back portion of the furnace 4. A coal grate 8 is attached to the back wall of the ash chest 7 below the opening 6. The coal grate is positioned substantially in level with the upper edge of the ash door 2, i.e. above the level of the air openings 2a, so that the secondary air from the ash door is passed through the coals positioned on the coal grate into the opening 6. The back portion of the furnace 4 is connected through a throat 9 to a secondary fire chamber in which the secondary burning takes place.

Figure 3:
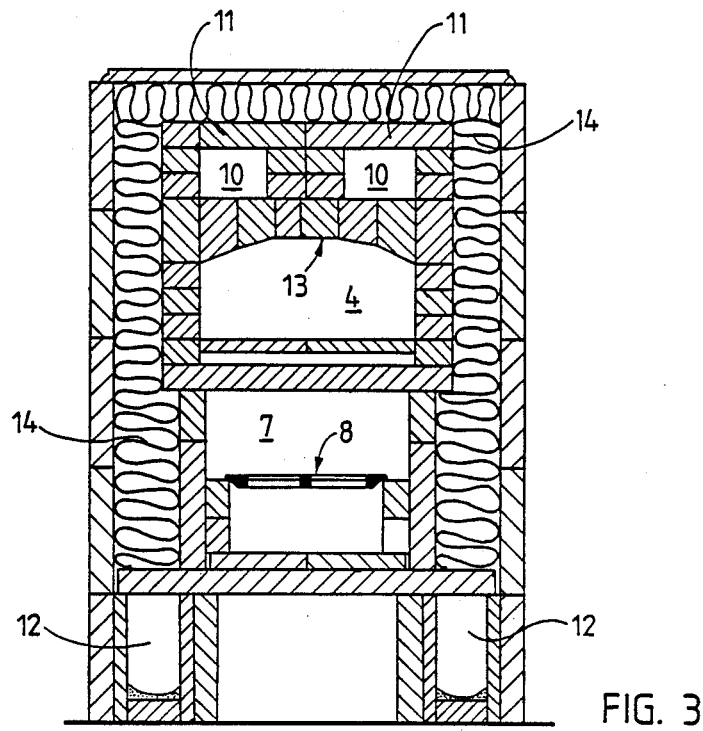
FIG. 3 is a transversal cross-sectional view of the oven along the line III—III shown in FIG. 2.

The secondary fire chamber, comprising two branches, is indicated with the reference numeral 10 in FIG. 3. The top of the secondary fire chamber 10 is covered with fire covers 11, so that the flue gases from the secondary fire chamber are passed through the cheek flues of the oven (FIG. 4) and further through lower flues 12 into the flue system (not shown). A top portion 13 of the furnace 4 is arched in a normal way in order that it would better reflect the heat to the baking grate 5. The gaps between the stone tiles of the furnace and the soap rock elements forming the outer face of the oven are sealed and insulated with mineral wool 14 as well as the gaps between the walls of the ash chest and the elements forming the outer face of the oven.

Figure 4:
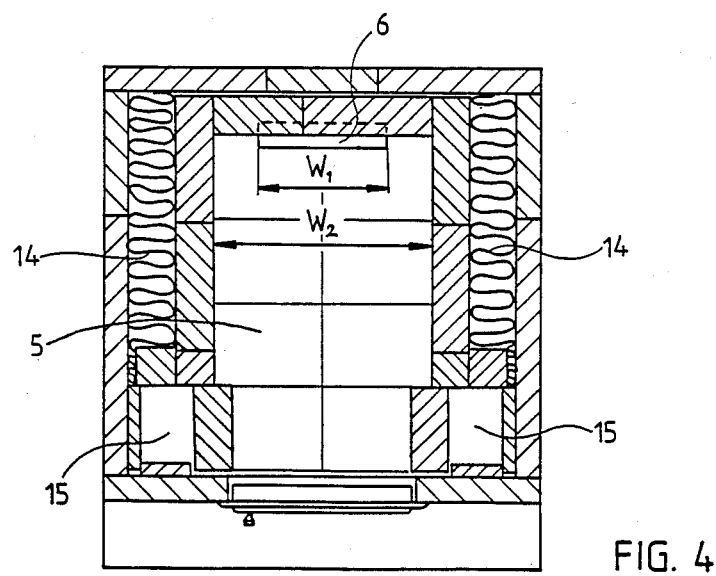
FIG. 4 is a cross-sectional view along the line IV—IV shown in FIG. 1.

In FIG. 4, the opening 6 is seen as a top view. As is apparent from the figure, the width $W_1$ of the opening is slightly smaller than the width $W_2$ of the baking grate. Vertical cheek flues 15 positioned in the front corners of the oven are also visible in FIG. 4, the flue gases from the secondary fire chamber being passed into the cheek flues 15. When the cheek flues are positioned in the front corners of the baking oven, the secondary fire chamber becomes longer, too, so that heat has more time to be transferred into the material contained in the oven. Thus the temperature of the flue gases when entering the chimney is not too high.

In the baking oven according to the invention, the wood is burnt in the furnace 4. Burning air (primary air) into the furnace 4 is introduced through the air openings 1a of the oven door 1. Burning air (secondary air) into the secondary fire chamber 10 is introduced through the air openings 2a of the ash door 2 and through the opening 6. In this way the secondary air is preheated and mixed with the burning gases in the back portion of the oven. The gas mixture is ready for secondary burning in the secondary fire chamber 10. The passages of the primary and secondary air from the oven and ash doors up to the cheek flues is illustrated by means of broken-line arrows A and B in FIG. 2.

Embers positioned on the baking grate 5 can be pushed on the opening 6 to be further burnt thereon, so that the complete burning is efficient. Thereafter the coals are easy to drop onto the coal grate 8, where they finally burn into ashes. Flue gases from the coals burning on the coal grate 8 pass through the opening 6 and further on similarly as the proper flue gases through the flues of the oven, so that the heat generated by the afterburning of the coals can also be recovered into the material contained in the oven. A further advantage of the solution according to the invention is that the ashes are not gathered behind the ash door 2, so that when the ash door is opened the ashes do not run on the floor.

Even though the invention has been described above with reference to the examples of the drawings, it is obvious that the invention is not restricted thereto, but can be modified in various ways without deviating from the inventive idea disclosed in the attached claims. Accordingly, the fireplace can be manufactured of various materials and the dimensions of the structure may be varied in different ways; for instance, a plurality of smaller openings 6 can be provided in the fireplace instead of one larger opening 6.

I claim:

1. A masonry baking oven comprising a housing including masonry front and back walls, a combination oven and furnace chamber in the housing in which fuel is burnt into gases and in which food is baked thereafter, said furnace and oven chamber having a masonry baking surface extending between said front and back walls, an oven door positioned in the front wall to open and close the combination furnace and oven chamber, said oven door being provided with first air openings through which primary air is introduced into said oven and furnace chamber, an ash chest in the housing and positioned below the oven and furnace chamber and having an ash door, said ash door being provided with secondary air openings, a secondary fire chamber positioned in the housing above the furnace and oven chamber, means forming a throat leading from a back portion of the oven and furnace chamber opposite the oven door and into said secondary fire chamber, substantially vertical ckeek flue in the housing extending downward from the secondary fire chamber on opposite sides of said oven door adjacent the front wall, and means forming an opening at a back portion of the oven and furnace chamber below said throat connecting the ash chest to the back portion of the oven and furnace chamber and to the secondary fire chamber via said oven and furnace chamber, whereby secondary air introduced into said secondary fire chamber through said secondary air openings is mixed with burning gases at the back portion of the oven and furnace chamber, and wherein there is further included a coal grate in the ash chest adjacent the back wall and below said opening to receive coals from the oven and furnace chamber through said openings, said coal grate being positioned above the level of said secondary air openings of the ash door.

* * * * *

UNITED STATES PATENT AND TRADEMARK OFFICE
CERTIFICATE OF CORRECTION

PATENT NO.  : 4,850,332

DATED  : July 25, 1989

INVENTOR(S) : Juha Sivonen

It is certified that error appears in the above-identified patent and that said Letters Patent is hereby corrected as shown below:

On the title page of the patent, below the Inventor's name, the following is added:

--ASSIGNEE: SUOMEN VUOLUKIVI OY, Finland--.

Signed and Sealed this

Fifth Day of February, 1991

*Attest:*

HARRY F. MANBECK, JR.

*Attesting Officer*      *Commissioner of Patents and Trademarks*